(12) United States Patent
Nenni, Jr.

(10) Patent No.: US 8,311,288 B2
(45) Date of Patent: Nov. 13, 2012

(54) BIOMETRIC DATA ENCRYPTION

(75) Inventor: Mark Anthony Nenni, Jr., Brockport, NY (US)

(73) Assignee: Xerox Corporation, Norwalk, CT (US)

( * ) Notice: Subject to any disclaimer, the term of this patent is extended or adjusted under 35 U.S.C. 154(b) by 754 days.

(21) Appl. No.: 12/484,378

(22) Filed: Jun. 15, 2009

(65) Prior Publication Data

US 2010/0316260 A1 Dec. 16, 2010

(51) Int. Cl.
*G06K 9/00* (2006.01)

(52) U.S. Cl. .......................................... 382/115

(58) Field of Classification Search .................. 382/100, 382/115–124, 209, 218; 340/5.82, 5.83, 340/5.84; 713/186; 902/1–3
See application file for complete search history.

(56) References Cited

U.S. PATENT DOCUMENTS

| | | | |
|---|---|---|---|
| 6,580,814 B1 * | 6/2003 | Ittycheriah et al. | 382/115 |
| 6,925,182 B1 * | 8/2005 | Epstein | 380/277 |
| 7,444,007 B2 * | 10/2008 | Schonberg et al. | 382/117 |
| 7,805,614 B2 * | 9/2010 | Aull et al. | 713/186 |
| 2003/0145218 A1 | 7/2003 | Hutchison | |
| 2003/0195935 A1 * | 10/2003 | Leeper | 709/206 |
| 2010/0005144 A1 * | 1/2010 | Wu | 709/206 |

* cited by examiner

*Primary Examiner* — Daniel Mariam
(74) *Attorney, Agent, or Firm* — Hoffmann & Baron, LLP

(57) ABSTRACT

A printmaking device, a method, and a system for securely handling a set of documents are provided herein. The printmaking device includes a printing module capable of printing the set of documents, and a processor operatively connected to the printing module to facilitate providing the set of documents to said printing module. The processor is configured to receive an initial biometric sample; encrypt a set of documents using said initial biometric sample; transmit the set of documents to another device; and delete said initial biometric sample from the device after the set of documents are encrypted.

22 Claims, 3 Drawing Sheets

BIOMETRIC DATA ENCRYPTION

TECHNICAL FIELD

This disclosure generally relates to a biometric data authentication method and system. It more particularly concerns transmitting a set of documents over a network using biometrics, such as a fingerprint, for encrypting data.

BACKGROUND

Fingerprint authentication methods are well known in the art. One typical method using fingerprint security involves storing a user's fingerprint, transmitting the fingerprint across a network, and validating the fingerprint at a printer or a computing device. Using this method, a fingerprint can be stolen simply by gaining access to the storage mechanism or by sniffing network packets. Thus, opening the possibility that images or documents using the above fingerprint security could also be stolen.

Another method using fingerprint security is a public key algorithm. In public key algorithms, the data is stored. The algorithm requires the key to be authenticated. Once the key is authenticated all the data is readable and available for access. Since the data is stored in the public key algorithm, the data can potentially be stolen, compromising the security. Therefore, public key algorithms may not be better than storing and validating the fingerprint as provided above.

While prior methods for encryption have been successful, there exists a need for an encryption method that does not store and/or transmit the fingerprint information over the network, and only uses the fingerprint as an initialization seed for a data encryption algorithm.

SUMMARY

According to aspects illustrated herein, there is provided a printmaking device for securely handling a set of documents. The printmaking device includes a printing module capable of printing the set of documents, and a processor operatively connected to the printing module to facilitate providing the set of documents to the printing module. The processor is configured to: receive an initial biometric sample; encrypt a set of documents using said initial biometric sample; transmit the set of documents to another device; and delete said initial biometric sample from the device after the set of documents are encrypted.

According to other aspects illustrated herein, there is provided a method for securely handling a set of documents on a network. First, the method generates the set of documents and obtains an initial biometric sample with the initial biometric sample being represented as an encryption binary number. Next, the set of documents are encrypted using the security software. The software uses the encryption binary number as an encryption initialization seed in a data encryption algorithm. After that, the encrypted set of documents are transmitted across the network and the initial biometric sample is deleted. Then, the method obtains a verification biometric sample, with the verification biometric sample being represented as a decryption binary number. Subsequently, the security software uses the decryption binary number as a decryption initialization seed in a data decryption algorithm. If the initial biometric sample and verification biometric sample match, then the security software decrypts the set of documents and provides the set of documents to a user. Finally, the method deletes the verification biometric sample.

According to further aspects illustrated herein, there is provided a system for securely handling a set of documents on a network including: at least two computing devices configured to be operatively connected via the network; a biometric reader operatively connected to each of the at least two computing devices; and a security software program configured to securely handle a set of documents being transmitted between the at least two computing devices over the network. The security software program being configured to: obtain an initial biometric sample, using the biometric reader; represent the initial biometric sample as a binary number; encrypt the set of document using the representation of the initial biometric sample as an encryption initialization seed in a data encryption algorithm; transmit the set of documents across the network; delete the initial biometric sample; obtain a verification biometric sample, using the biometric reader; and use the decryption binary number as a decryption initialization seed in a decryption algorithm. If the initial biometric sample and the verification biometric sample match, then the security software decrypts the set of documents and the set of documents are provided to a user. The security software is further configured to delete the verification biometric sample.

Additional features and advantages will be readily apparent from the following detailed description, the accompanying drawings and the claims. It is to be understood, however, that the drawings are designed as an illustration only and not as a definition of the limits of the disclosure.

BRIEF DESCRIPTION OF THE DRAWINGS

Like reference symbols in the various drawings indicate like elements.

DETAILED DESCRIPTION

Referring to FIGS. 1-4, a method, a system, and a printmaking device for securely handling a set of documents on a network using biometric data encryption are disclosed.

As used herein, the phrase "computing device" includes a computer, a server, a printmaking device, a hard drive, a database, or any other electronic device with a digital front end hard drive.

As used herein, the phrase "printmaking device" encompasses any apparatus, such as a digital copier, bookmaking machine, facsimile machine, and multi-function machine, which performs a printing outputting function for any purpose.

As used herein, the term "network" includes a group of two or more computing devices connected and configured to communicate therebetween.

As used herein, the term "handling" includes sending, receiving, printing, and storing electronic data.

As used herein, the phrase "set of documents" includes one or more substrates with or without an image or text. The set of documents may be saved as a document readable by the computing devices. Examples include, but are not limited to, the following types of documents: word, portable document format (PDF), and Joint Photographic Experts Group (JPEG).

As used herein, the term "substrate" includes, for example, one or more of a usually flimsy physical sheet of paper, heavy media paper, coated paper, transparency, parchment, film, fabric, plastic, or other suitable physical print media substrate on which information can be reproduced.

As used herein, the term "transmitting" and "transmit" refer to sending data over a network.

As used herein, the term "biometric" refers to any data that can be associated, for security purposes, with a substantially unique living body and the data collected is repeatable and recordable.

As used herein, the terms "obtaining an initial biometric sample" and "obtaining a verification biometric sample" include scanning a finger, an iris, or a voice print using a biometric reader, or using any method known in the art to obtain an electronic copy of the biometric data.

As used herein, the term "generating" includes creating, opening, receiving, accessing, or obtaining an electronic file.

As used herein, the terms "security software program" and "security software" refer to anything that is not hardware, but used with hardware in a computing device. An example includes one or more computer programs designed to perform one or more tasks on a computing device.

Figure 1:
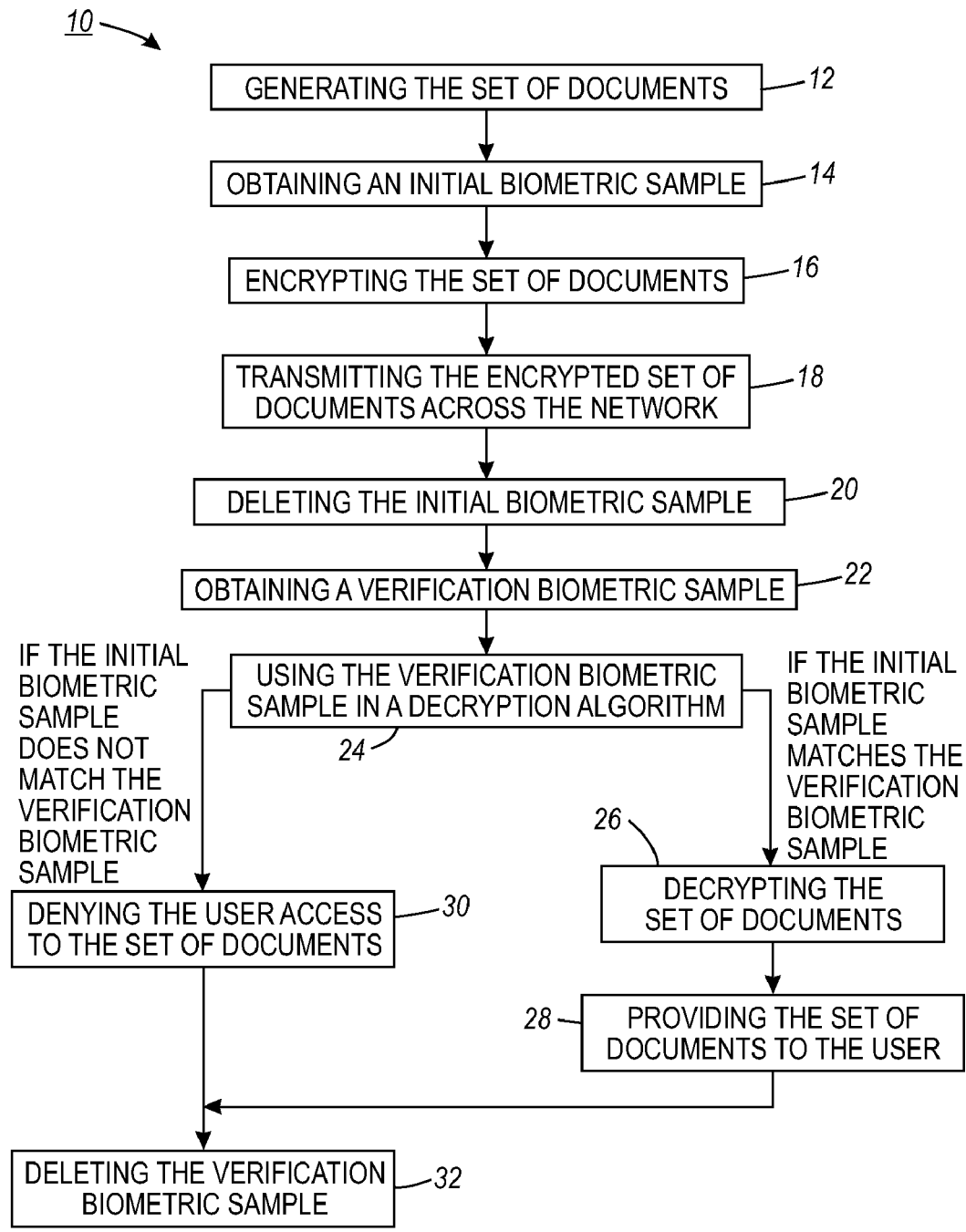
FIG. 1. illustrates a method for handling a set of documents using biometric authentication.

FIG. 1 provides an example method 10 for securely handling a set of documents across a network using biometric data encryption. The method 10 in step 12 generates a set of documents on a first computing device. In step 14, the method 10 obtains an initial biometric sample using the first computing device. The initial biometric sample is represented as an encryption binary number.

The initial biometric sample is then used in step 16 to encrypt the set of documents using the encryption binary number as an encryption initialization seed in a data encryption algorithm. After that, in step 18, the encrypted set of documents are transmitted across the network to a second computing device, and in step 20, the initial biometric sample is deleted from the first computing device.

Then, in step 22, the second computing device obtains a verification biometric sample using the biometric reader. The verification biometric sample is represented as a decryption binary number. Next, step 24 uses the decryption binary number as a decryption initialization seed in a data decryption algorithm.

If the initial biometric sample and the verification biometric sample match, then the security software decrypts the set of documents in step 26. After the set of documents are decrypted, step 28 provides the set of documents to a user and the verification biometric sample is deleted in step 32. The set of documents may be presented to the user for one or more of the following including but not limited to viewing, printing, storing, and sending. For example, the encrypted set of documents may be in the form of a word document. Decrypting the word document may allow the user to open the word document, print the word document, save the word document on a computer, and/or send the word document in an e-mail.

Alternatively, if the initial biometric sample and the verification biometric sample do not match, the user is denied access to the set of documents in step 30. Then, step 32 deletes the verification biometric sample from the second computing device without providing access to the set of documents.

The steps 20 and 32 of deleting the initial biometric sample and the verification biometric sample are important because deletion of the biometric data ensures that the biometric data is not saved on the computing devices or the security software. By not saving the biometric data, each user's personnel identification information and the encrypted documents remain protected against unauthorized access.

Note, the method 10 described herein may be performed using a combination of computing devices, security software, and other hardware and software known to those skilled in the art. For example, the initial and verification biometric samples may be obtained using a biometric reader and/or the security software. Furthermore, the initial and verification biometric samples may be deleted by the security software and/or the computing devices.

The encryption and decryption algorithms used in the above method 10 may vary. An example of an encryption algorithm for data security is a matrix algorithm, but the security software may use any encryption algorithm known to those skilled in the art that requires an initialization seed. As described above, the initialization seed may be any biometric sample, such as fingerprint or a thumbprint, a voice print, and an iris scan; however, the term "biometric data" is not limited to the above examples and may include any other repeatable and recordable data capable of being represented as a binary number.

The encryption and decryption algorithms may use two distinct equations. The equations may each require the biometric data to be represented by the same binary number to solve the algorithms. Therefore, as long as the initial biometric sample and the verification biometric sample are identical, the security software is capable of using the biometric data to encrypt and decrypt the set of documents.

The encryption and decryption algorithms may also be the same equation. When the same equation is used, the initial biometric sample is used to encrypt the set of documents and the verification biometric sample is used to decrypt the set of documents. The only difference is that when the verification biometric sample is received, the decryption algorithm operates in reverse of when the initial biometric sample is received by the encryption algorithm. Again, the initial biometric sample and the verification biometric sample must be identical for the set of documents to be decrypted.

Figure 2:
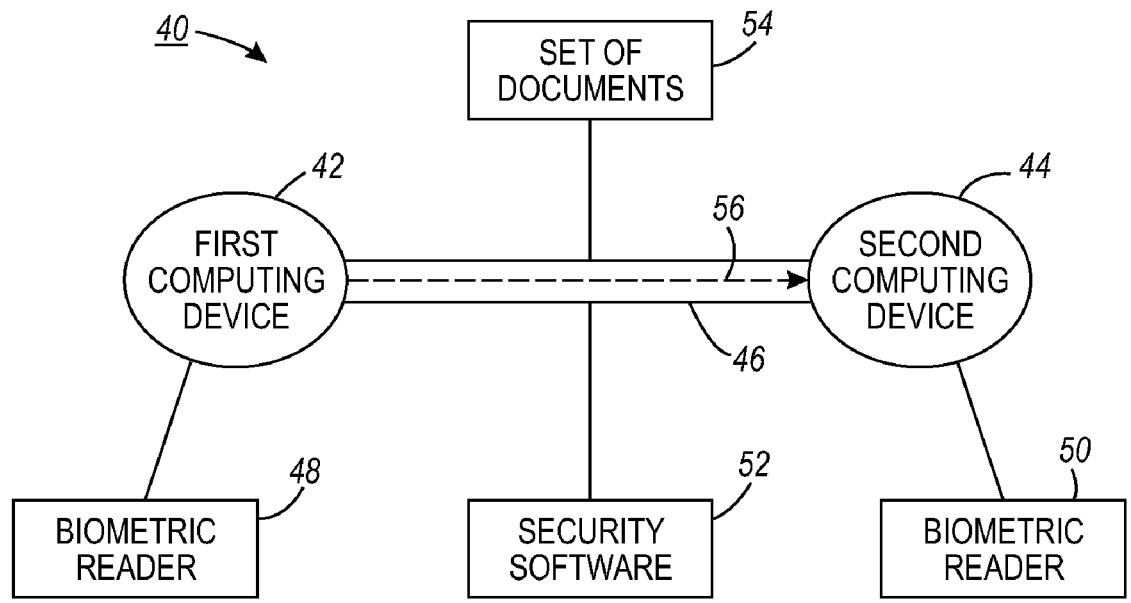
FIG. 2 illustrates a system for handling a set of documents using biometric authentication.

As shown in FIG. 2, a system 40 for use with the method 10 of FIG. 1 is provided. The system 40 includes a first and a second computing device 42, 44 configured to be operatively connected via the network 46; a first biometric reader 48 operatively connected to the first computing device 42; a second biometric reader 50 to the second computing device 44; and a security software program 52. The security software program 52 is configured to securely handle a set of documents 54 being transmitted 56 between the first and the second computing devices 42, 44 over the network 46. The security software program 52 and/or the first computing device 42 may work in combination to: obtain the initial biometric sample using the first biometric reader 48; represent the initial biometric sample as an encryption binary number; encrypt the set of documents 54 using the encryption binary number as an encryption initialization seed in a data encryption algorithm; transmit 56 the set of documents 54 across the network 46; and delete the initial biometric sample after the set of documents 54 are transmitted 56 across the network 46. The security software program 52 and/or the second computing device 44 may further work in combination to obtain the verification biometric sample using the second biometric reader 50; represent the verification biometric sample as a decryption binary number; use the decryption binary number as a decryption initialization seed; and delete the verification biometric sample after either the set of documents 54 are decrypted and provided to a user, or the user is denied access.

Figure 3:
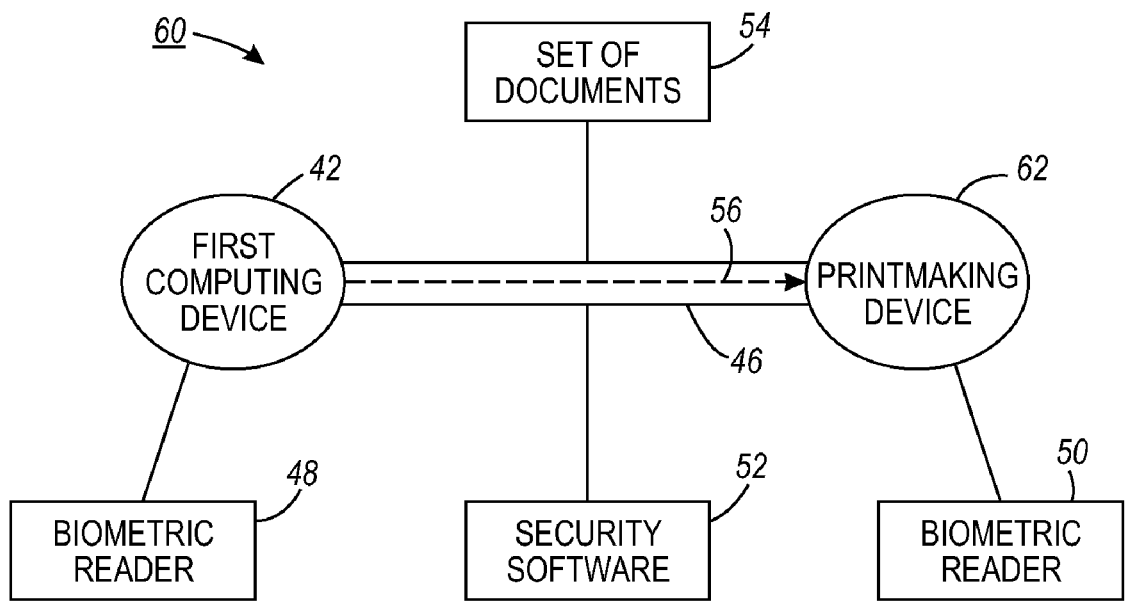
FIG. 3 illustrates a system for printing a set of documents using biometric authentication.

While the above description and FIGS. 1-2 provide an example of a method 10 and a system 40 for securely handling a set of documents 54 on a network 46, it is readily understood that the broader aspects of this disclosure are applicable to many types of computing devices, including printmaking devices. For example, FIG. 3 provides an additional system 60 for securely printing a set of documents 54 on a network 46 using biometric data encryption. The system 60 is similar to FIG. 2, but the second computing device 44 is a printmaking device 62. Similarly, the method of FIG. 1 may also be applied to FIG. 3, with the set of documents 54 being provided to the user, as in step 28 of FIG. 1, but in printed form.

Figure 4:
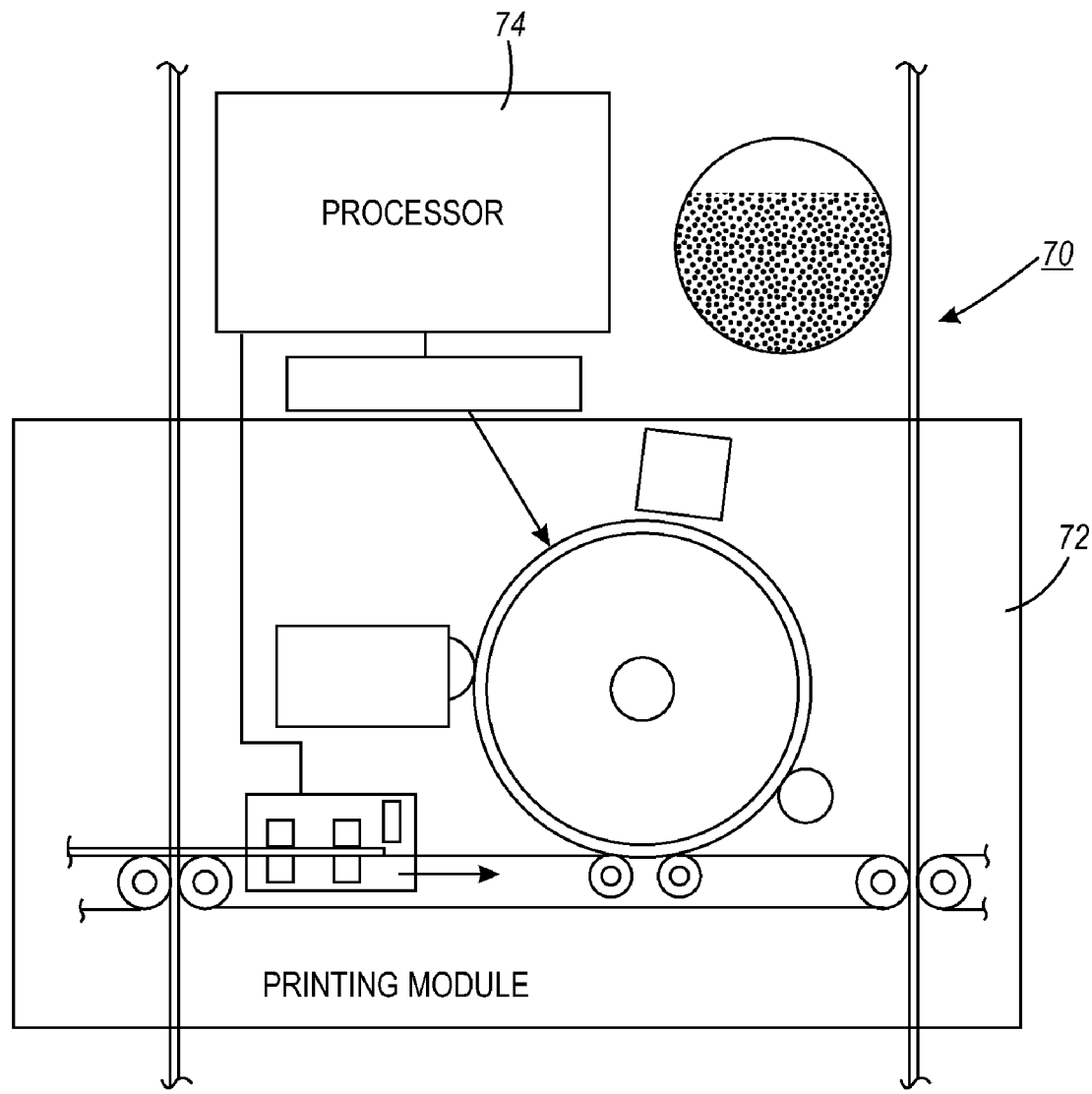
FIG. 4 illustrates a printmaking device for use with the method and system of FIGS. 1-3.

FIG. 4 provides an example of a printmaking device 70 for use with the method 10 of FIG. 1 and the systems 40, 60 of FIGS. 2-3. The printmaking device 70 includes a printing module 72 capable of printing the set of documents 54 and a processor 74 capable of controlling the printmaking device 70. The printing module 72 and the processor 74 are operatively connected to facilitate providing the set of documents 54 to the printing module 72 for printing. The processor 74 may be configured to receive an initial biometric sample and generate the set of documents 54 from a software application and/or by receiving one or more electronic files from another device. Next, the set of documents 54 may then be encrypted by the processor 74 using the initial biometric sample. Then, the processor 74 may be configured to transmit the set of documents 54 to another device or save the set of documents 54 on the printmaking device 70. After that, the processor 74 is capable of deleting the initial biometric sample.

The processor 74 may further be configured to receive a verification biometric sample and the set of documents 54 from another device in encrypted form. Next, the processor 74 is configured to use the verification biometric sample to decrypt the set of documents 54. Then, the processor 74 is capable of providing the set of documents 54 to a user if the initial and verification biometric samples match. After an attempt is made to decrypt the set of documents 54, whether decryption is successful or not, the processor 74 is capable of deleting the verification biometric data from the printmaking device 70.

The advantages of the present application over other fingerprint and/or biometric security mechanisms include the ability of the method 10 and systems 40, 60 provided herein to use biometric data to encrypt and decrypt a set of documents 54 without permanently storing the biometric data on the computing devices 42, 44, 62 and without transmitting the biometric data or other data associated with the encryption algorithm over the network 46. Additionally, using the method 10 and systems 40, 60 provided herein, the set of documents 54 are not interpretable even if stolen off the network 46 or the computing devices 42, 44, 62 because the biometric data is needed to decrypt the encrypted set of documents 54. Therefore, the method 10 and systems 40, 60 provided herein protect the set of documents 54 and the biometric data while the set of documents 54 are being stored, transmitted 56 over a network 46, opened or accessed by a user, and/or printed using a printmaking device 62. Previous fingerprint and/or security mechanisms fail to provide such protection.

It will be appreciated that various of the above-disclosed and other features and functions, or alternative thereof, may be desirably combined into many other different systems or applications. Various presently unforeseen or unanticipated alternatives, modifications, variations, or improvements therein may be subsequently made by those skilled in the art which are also intended to be encompassed by the following claims. In addition, the claims can encompass embodiments in hardware, software, or a combination thereof.

What is claimed is:

1. A method for securely handling a set of documents on a network comprising:

generating the set of documents;

obtaining an initial biometric sample, wherein said initial biometric sample is represented as an encryption binary number;

encrypting the set of documents using a security software, wherein said security software uses said encryption binary number as an encryption initialization seed in a data encryption algorithm;

transmitting the encrypted set of documents across the network;

deleting said initial biometric sample;

obtaining, after said encrypting the set of documents, a verification biometric sample using a biometric reader, wherein said verification biometric sample is represented as a decryption binary number;

using said decryption binary number as a decryption initialization seed in a data decryption algorithm, wherein if said initial biometric sample and said verification biometric sample match then said security software:

decrypts the set of documents; and provides the set of documents to a user; and deleting said verification biometric sample.

2. A method of claim 1, wherein said initial biometric sample and said verification biometric sample include the same one of the following selected from the group consisting of fingerprints, iris scans, and voice prints.

3. A method of claim 1, wherein the set of documents are encrypted using a matrix algorithm.

4. A method of claim 1, wherein the set of documents are generated on a first computing device.

5. A method of claim 4, wherein said initial biometric sample is obtained on said first computing device.

6. A method of claim 4, wherein said first computing device is a printmaking device.

7. A method of claim 1, wherein said verification biometric sample is obtained on a second computing device.

8. A method of claim 1, wherein said encrypted set of documents are transmitted across the network from a first computing device to a second computing device.

9. A method of claim 8, wherein said second computing device is a printmaking device configured to print the decrypted set of documents.

10. A method of claim 1, wherein said initial biometric sample is obtained using said security software.

11. A method of claim 1, wherein said initial biometric sample is deleted using said security software.

12. A method of claim 1, wherein said verification biometric sample is obtained using said security software.

13. A method of claim 1, wherein said verification biometric sample is deleted using said security software.

14. A system for securely handling a set of documents on a network comprising:

at least two computing devices configured to be operatively connected via the network;

a biometric reader operatively connected to each of said at least two computing devices; and a security software program configured to securely handle a set of documents being transmitted between said at least two computing devices over the network;

wherein the security software program:

obtains an initial biometric sample, using the biometric reader;

represents said initial biometric sample as an encryption binary number;

encrypts said set of document using said encryption binary number as an encryption initialization seed in a data encryption algorithm;

transmits said encrypted set of documents across the network;

deletes said initial biometric sample;

obtains a verification biometric sample, after said set of documents are encrypted, using the biometric reader;

represents said verification biometric sample as a decryption binary number;

uses said decryption binary number as a decryption initialization seed, wherein if said initial biometric sample matches said verification biometric sample, then said set of documents are:

decrypted; and provided to a user;

and deletes said verification biometric sample.

15. A system of claim 14, wherein said initial biometric sample and said verification biometric sample include the same one of the following selected from the group consisting of fingerprints, iris scans, and voice prints.

16. A system of claim 14, wherein the set of documents are encrypted using a matrix algorithm.

17. A system of claim 14, wherein said set of documents are generated on a first computing device.

18. A system of claim 17, wherein said initial biometric sample is obtained on said first computing device.

19. A system of claim 17, wherein said first computing device is a printmaking device.

20. A system of claim 14, wherein said encrypted set of documents are transmitted across the network from a first computing device to a second computing device.

21. A system of claim 20, wherein said second computing device is a printmaking device configured to print said decrypted set of documents.

22. A system of claim 14, wherein said verification biometric sample is obtained on a second computing device.

* * * * *